J. A. SCOTT.
BREAD CUTTER.
APPLICATION FILED JUNE 7, 1921.

1,405,720.                                              Patented Feb. 7, 1922.

Inventor
John A. Scott
By Herbert E. Smith
Attorney

UNITED STATES PATENT OFFICE.

JOHN A. SCOTT, OF SPOKANE, WASHINGTON.

BREAD CUTTER.

1,405,720.   Specification of Letters Patent.   Patented Feb. 7, 1922.

Application filed June 7, 1921. Serial No. 475,799.

*To all whom it may concern:*

Be it known that I, JOHN A. SCOTT, a citizen of the United States, residing at Spokane, in the county of Spokane and State of Washington, have invented certain new and useful Improvements in Bread Cutters, of which the following is a specification.

My present invention relates to improvements in bread cutters designed especially for slicing or cutting loaves of bread, but applicable for use in other relations for slicing or cutting thin, or comparatively thin slices from a body. The primary object of the invention is the provision of a knife that will slice the bread without the objectionable feature of crumbling the bread; which may be manipulated with facility and dispatch; which may be utilized in connection with a gage frame for accurately cutting slices of uniform thickness, and which may have its blades readily interchangeable for the purpose of supplying sharp knives or cutting blades. To this end the invention consists in certain novel combinations and arrangements of parts comprising a comparatively thin blade or ribbon as the cutting element, which is supported in off-set position from the blade frame or handle portion, and in certain details of construction for supporting the blade from its frame and adjusting the tension of the ribbon blade or thin cutter as will be more specifically set forth hereinafter.

In the accompanying drawings I have illustrated one complete example of the physical embodiment of my invention wherein the parts are combined and arranged according to the best mode I have thus far devised for the practical application of the principles of my invention.

Figure 1:
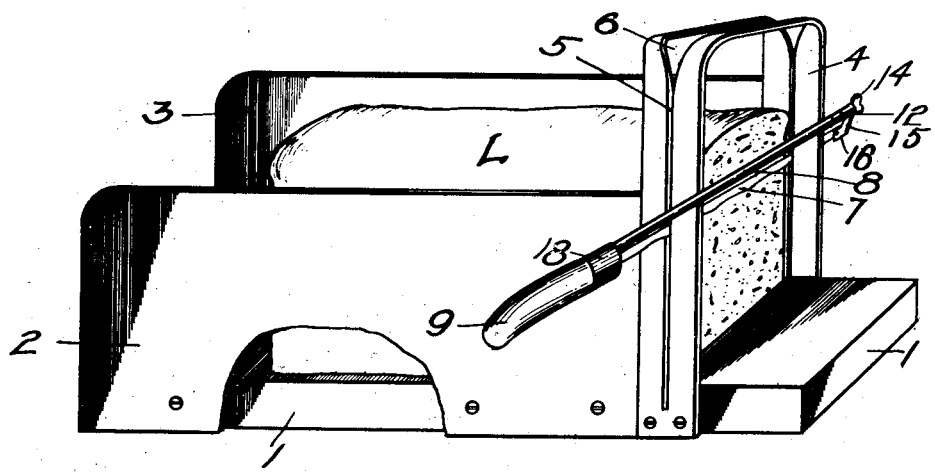
Figure 1 is a perspective view of a bread cutter embodying my invention, showing the knife in cutting position, and part of the loaf holder broken away for convenience of illustration.

In the preferred form of the invention as illustrated in the drawings I have shown a loaf holder for the loaf of bread indicated as L in Figure 1 from which the slices are to be cut. The holder is preferably provided with a wooden base or cutting board 1 rectangular in shape and provided with a pair of side plates 2 and 3 which may be of suitable material to form a trough or holder, in connection with the board, for the reception of the loaf L. At the front of the loaf holder I utilize a gauge frame 4, preferably of inverted U-shape in the form of a yoke and secured at its lower ends to the sides of the base board 1 as seen in Figure 1. The two legs of the gage frame are fashioned with alined slots 5, which merge into a comparatively wider slot 6 in the top bar of the U-shape gage frame, and these slots are adapted, as will be readily apparent, for the reception and guidance of the knife blade 7, when cutting bread as indicated in Figure 1 wherein the loaf holder is utilized.

Figure 2:
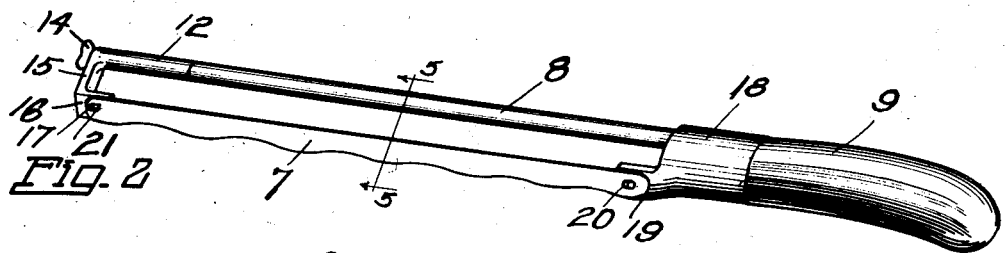
Figure 2 is a perspective view of the bread knife ready for use.
Figures 3, 4:
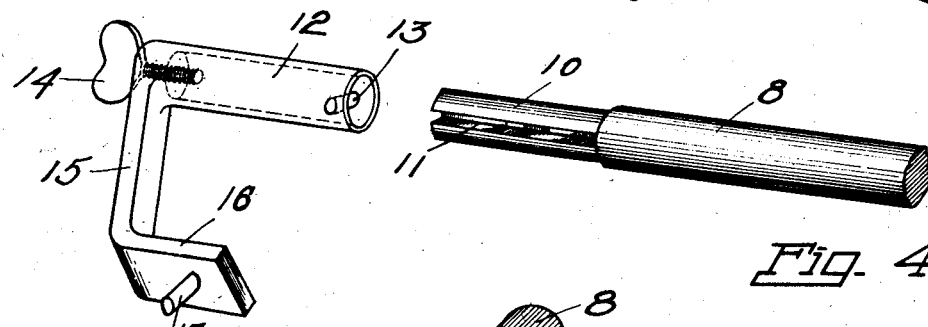
Figure 3 is a perspective view of an adjustable ferrule with bracket arm for supporting the blade.
Figure 4 is a complementary view of a portion of the knife bar showing its relation to the ferrule of Figure 3.
Figure 5:
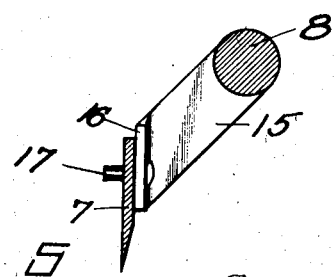
Figure 5 is an enlarged, detail, transverse sectional view at line 5—5 of Figure 2 through the knife blade and knife bar.

As shown in Figures 2 and 5 this blade is of comparatively thin metal, in the form of a ribbon, and is offset and supported from a parallel knife bar 8 preferably round in cross section and of suitable length and material, and provided with a handle 9 of convenient shape to be grasped in the hand. At its free end the knife bar is fashioned with a reduced extension 10 and this extension is equipped with a longitudinally extending slot 11 in its periphery opening at the extremity of the extension. Figures 3 and 4 indicate the relation of the extension to the metallic, cylindrical ferrule 12 which is adapted to receive the extension, and a stud or pin 13 passed through the wall of the ferrule and extending radially thereof is positioned to slide in the groove 11. Thus the extension may be entered in the end of the ferrule, guided by the pin in the slot, and the ferrule may be adjusted longitudinally of the extension, the pin in the slot preventing relative rotary movement of the parts. Through the end wall of the ferrule a screw 14 is threaded, and this screw is of sufficient length to project longitudinally along the axis of the ferrule and encounter the free end of the extension 10 of the knife bar 8, for the purpose to be described.

A laterally projecting arm 15 is cast integral with the ferrule, and is provided with an attaching angular flange 16 from which laterally projects a stud or pin 17, upon which the distal end of the knife blade 7 is supported. At the handle or heft end of the knife, the latter is supported from a fixed ferrule 18 that is attached in suitable manner to the handle 9, and this ferrule has a lateral flange 19 alined with the flange 16 at the distal end of the blade, between which flanges the blade is supported. The flange 19 has a stud 20 similar to the stud 17, and the ends of the knife blade are punched to form slots 21 which permit the blade to be slipped over these studs for support. The studs may have retaining heads if desired or necessary, and it will be apparent that the blade, when attached for use, is applied to these two studs after the extension 10 has been inserted in the ferrule 12 as in Figure 2. After the blade has been applied, the set screw 14 is turned, and as its free end is in direct contact with the free end of the extension it will readily be seen that the blade is stretched taut or placed under tension by the longitudinal movement of the ferrule 12 caused by the application of pressure transmitted from the set screw to the extension. In this manner the thin, resilient blade is brought to the proper tension to insure a proper and correct slicing action of the knife when utilized in Figure 1. Here the blade has been slipped through the wide top slot 6 down into the narrow guide slots 5 and the knife bar at the front of the guide frame or arched yoke 4 reciprocates forward and backward across the frame, the blade passing through the slotted yoke.

The knife is also capable of use without the guidance of the loaf holder and may be utilized in customary manner for bread knives, the knife bar 8 acting as a gage for the thickness of the slice cut from the loaf.

When desired or necessary to change the blade for any reason, the set screw 14 is withdrawn, permitting the ferrule to slide inwardly on its extension 10, thus relieving the tension of the knife blade, and the latter may be withdrawn from the studs 16 and 20 and replaced by a fresh blade.

As thus illustrated and described it will be apparent that I have provided a knife and slicing device which fulfills the conditions set forth as the purposes and objects of my invention, and which performs its functions in a comparatively perfect manner.

Having thus fully described my invention, what I claim as new and desire to secure by Letters Patent is—

1. The combination with a handle, and knife-bar having a reduced, grooved extension, of a ferrule having a guide pin and movable on said extension, means for adjusting the ferrule with relation to the extension, a flanged bracket arm on said ferrule and a stud thereon, a ferrule fixed to the handle and a stud thereon, and a slotted knife blade offset from said bar and supported on said studs.

2. The combination with a handle and fixed knife bar and a fixed ferrule on said handle having an attaching flange and stud, a longitudinally movable supporting member on said bar and means for preventing rotary movement of said member on the bar, an attaching flange and stud on said member, a knife blade supported on said studs, and means for moving said member for placing said blade under tension.

In testimony whereof I affix my signature.

JOHN A. SCOTT.